I. A. MILLIRON.
APPARATUS AND PROCESS FOR PACKING ARTICLES.
APPLICATION FILED AUG. 15, 1913.
1,132,668.
Patented Mar 23, 1915.
2 SHEETS—SHEET 1.
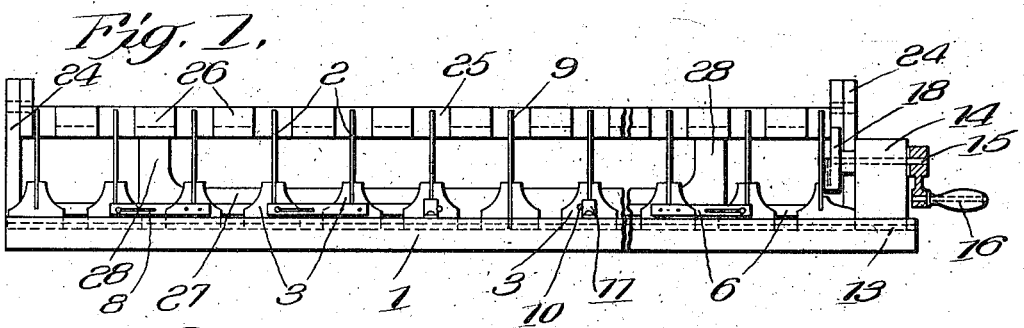
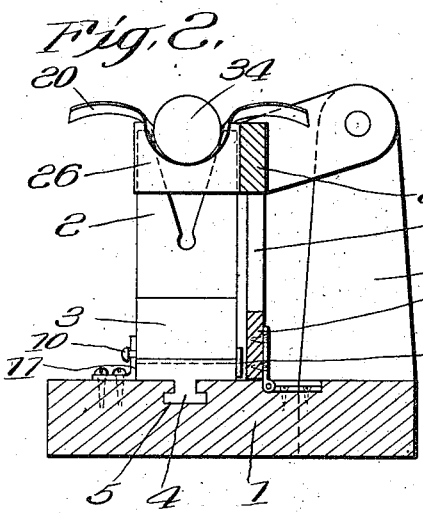
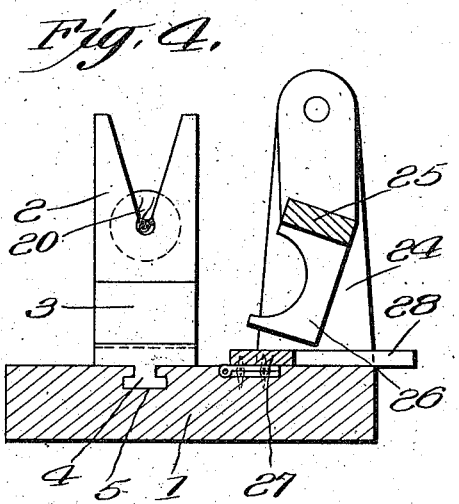
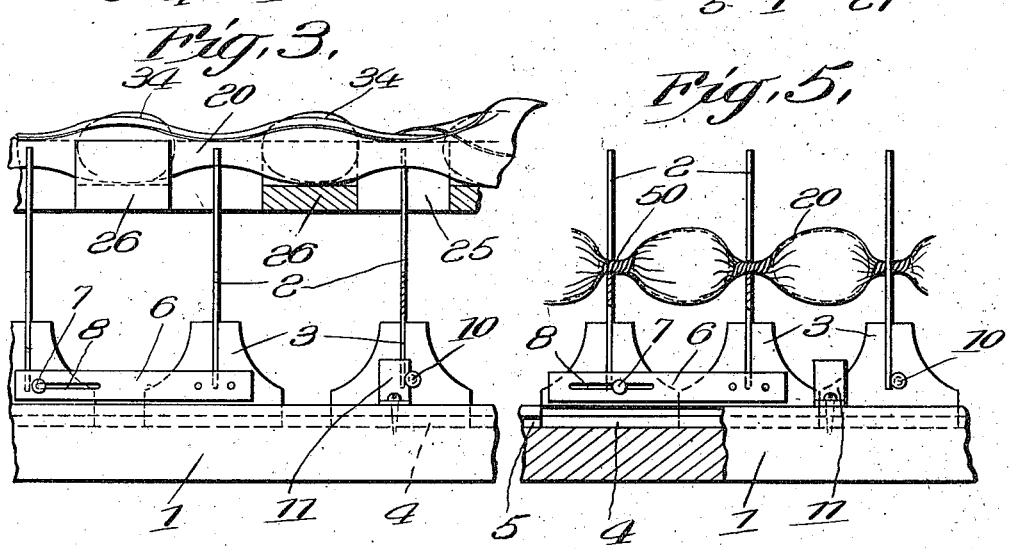
Witnesses:
Roscoe Millward
M. L. Breslin
Inventor
Ira A. Milliron
By his Attorney
Alfred Wilkinson I. A. MILLIRON.
APPARATUS AND PROCESS FOR PACKING ARTICLES.
APPLICATION FILED AUG. 15, 1913.
1,132,668. Patented Mar. 23, 1915.
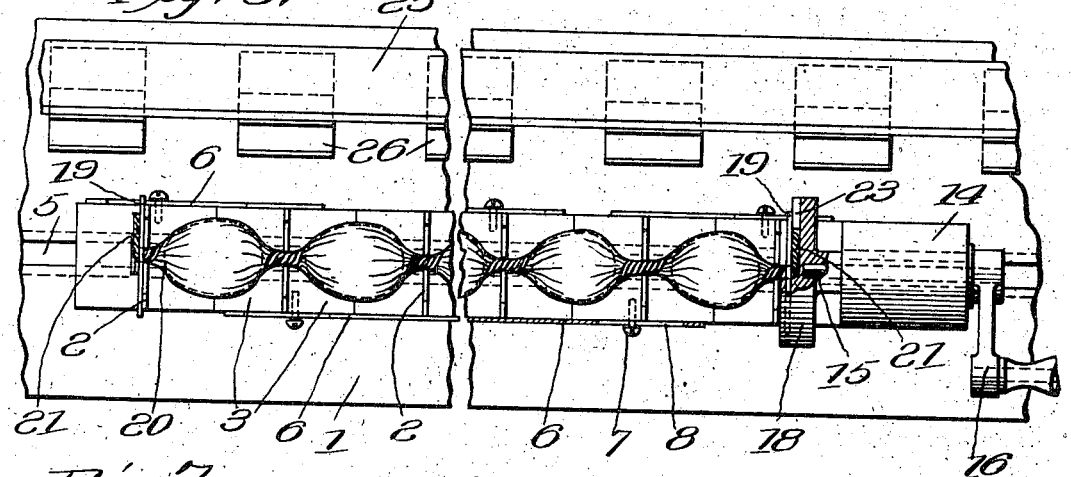
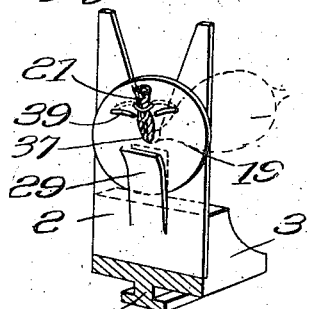
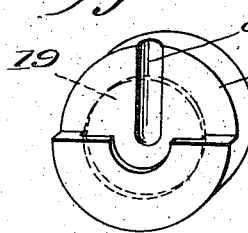
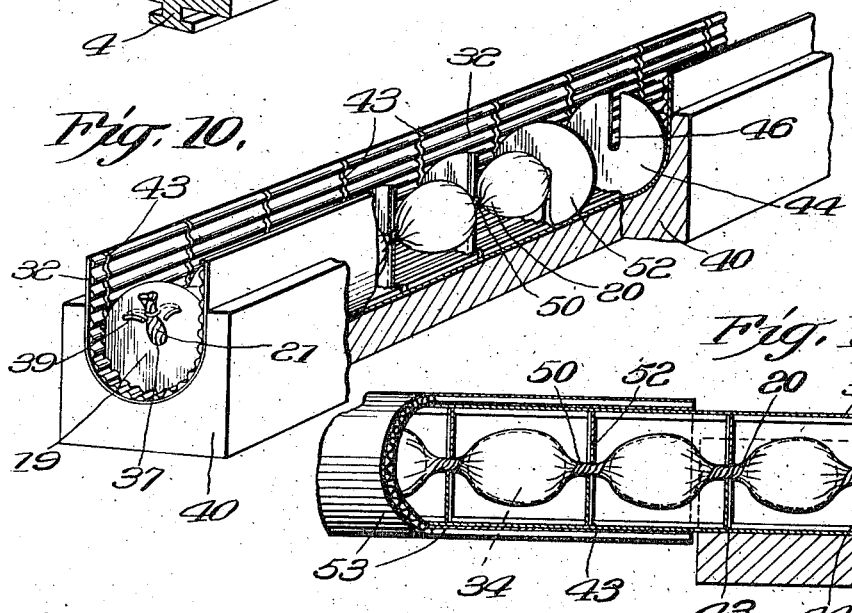
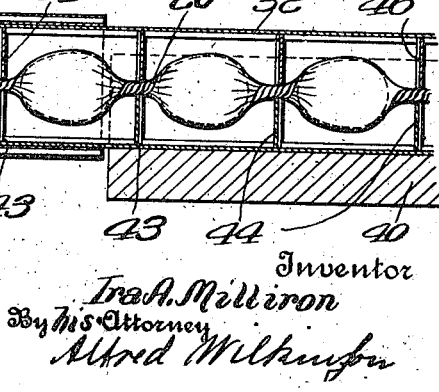

UNITED STATES PATENT OFFICE.

IRA A. MILLIRON, OF NEW YORK, N. Y., ASSIGNOR, BY MESNE ASSIGNMENTS, TO HAMMOCK EGG CARRIER COMPANY, A CORPORATION OF WEST VIRGINIA.

APPARATUS AND PROCESS FOR PACKING ARTICLES.

1,132,668.      Specification of Letters Patent.      Patented Mar. 23, 1915.

Application filed August 15, 1913. Serial No. 784,902.

*To all whom it may concern:*

Be it known that I, IRA A. MILLIRON, a citizen of the United States, residing at New York city, in the county of New York and State of New York, have invented new and useful Improvements in Apparatus and Processes for Packing Articles, of which the following is a specification.

My invention relates to an apparatus and method for inclosing the eggs in suitable containers in which they may be transported and is particularly adapted to the shipping of eggs in small quantities by parcel post etc. to be sent direct from the producer to the consumer, thereby making it possible for the producer easily and at short intervals to supply the consumer with absolutely fresh eggs without the interposition of the middleman. By this means the price to the consumer will be lowered, commonly below that of ordinary eggs, and the profit to the producer may be increased.

The important features of my apparatus are a carrier for sustaining the eggs suitably spaced on the upper strips which are folded around them to produce the envelop. After this initial operation the carrier is moved out of operative position and a standard is provided of suitable formation to receive the eggs in the envelop and sustain them while the material of the latter is being twisted to complete the formation of said envelop and the inclosing of the eggs therein.

My invention will be understood by reference to the drawing herewith in which the same reference numerals indicate the corresponding parts in all the figures.

Figure 1 is a side elevation of my apparatus. Fig. 2 is a cross section thereof enlarged with the carrier in operative position and the eggs and paper strips sustained thereon. Fig. 3 is a partial side elevation of Fig. 2. Fig. 4 is a cross section corresponding to Fig. 2 with the carrier swung out of position and the eggs and envelop sustained on the legs of the standard. Fig. 5 is a side elevation of Fig. 4. Fig. 6 is a top plan of the apparatus with the eggs and envelop in position on the standard after the twisting has been completed. Fig. 7 is a perspective view of the outer leg of the standard with the disk and the end of the envelop in position. Fig. 8 is a perspective view of the socket piece at the other end of the carrier. Fig. 9 is a plan of one of the intermediate disks. Fig. 10 shows the trough with the container and disks in position and the eggs in the envelop locked on the partition disks before the sides of the container are folded over (with portions broken away). Fig. 11 illustrates how the container is inserted into the tubular jacket after the sides of the former have been folded over.

In the figures 1 indicates the base, adapted to stand solidly on a table of convenient form and height for the operator engaged in the work of wrapping the eggs. On this base are supported the slides, which make up the standard, for supporting the eggs and the envelop during the twisting operation. These slides are composed of the forked legs 2 and pedestals 3 provided with dove-tail tongues 4, fitted to the slot 5 in the base. The slides are thus fitted to move longitudinally on the base, but the range of movement is limited, the minimum distance between the legs (on which the envelop and the eggs are directly supported) being regulated by the width of the pedestals, and the maximum distance by any suitable connections between the adjacent slides such as the slotted arms 6. As shown these arms are fixed to one slide and connected to the next by pin 7 engaging slot 8. In the particular construction here illustrated the central forked leg 9 is fixed on the base and the movement of the adjacent slides in relation thereto is limited by suitable stops 10 and 11, one stop being on the pedestal and the other, coöperating, stop on the base. At one end there is also fitted to the groove 5, by a tongue 13, a sliding post 14, to which is journaled a shaft 15 carrying at its outer end the crank 16 and on its inner end the socket-piece 18 to receive the end disk 19 or other part on the end of the envelop 20 for the purpose of twisting the latter as will be described. The socket-piece is formed snugly to receive the disk, but the locking of the latter in the socket piece is insured by the twisted and folded end 21 of the envelop protruding through the hole in the end disk 19 and extending into the slot 23 of the socket piece thus acting as a key.

To suitable posts 24 on the back of the standard is hinged the carrier formed of the back piece 25 and the concave carrier sections 26, each adapted to receive an individual egg, and suitably spaced so that a sufficient length of the envelop will be left between the eggs 34 to form the intermediate twists. Evidently this carrier may be a disconnected part, but it is more convenient to attach it to the standard by some suitable means. Initially this carrier is arranged in elevated position as shown in Figs. 1, 2 and 3 and is there maintained by any convenient means such as a leaf 27, hinged to the base so that it may be turned up to sustain the carrier on its arms 28, or turned down permitting the carrier to swing away out of position as best shown in Fig. 4.

The mechanism herein described is particularly adapted for carrying out the first steps of my process whereby the eggs are first securely inclosed in the envelop 20, preparatory to being deposited in the container 32.

The various operations are as follows: Strips 20 are provided of any suitable material which is sufficiently soft and flexible first to be wrapped around the eggs by hand, and sufficiently plastic, so to speak, there to maintain its position for the twisting operation. Certain sorts of fabric may be used but a reasonably tough and strong paper is a good material, and with most sorts of paper it will be better to wet the strip or strips 20. These wet strips are placed on the carrier held in its elevated position, as shown in Figs. 2 and 3, extending from end to end thereof. The eggs 34 are then placed on the strips as they lie on the carrier, one egg to each carrier section. The sides of the paper are then folded up and over the eggs. Then twist up with the fingers the ends 21 of the envelop so formed and insert the ends through the holes 37 (or slots) in the end disks 19 where said ends are secured by the wires 39 or other suitable means. These end disks may be made double and heavier than the intermediate disks if desired. This having been done the eggs in the partially formed envelop are ready for the twisting operation, whereby they are firmly inclosed in the envelop. To effect this, turn back the leaf 27 to remove the support for the carrier and swing it out of operative position, leaving the envelop and the eggs supported on the standard, with the eggs hung between the legs 2 as shown and the intermediate portions of the envelop dropped into the forks. The end disk 19 on the outer end of the envelop is pressed down on the outer side of the end leg into the spring clamp 29 so that practically it will not turn. The end disk at the inner end is set into the socket piece 18 and there firmly held by friction and by the envelop tips 21 protruding into the slot 23, so that by turning the handle the inner end of the envelop is rotated with the effect that the portion of the envelop between the first and second eggs is first twisted, and by continuing to turn the handle this torsional effect is extended down the entire length of the envelop to all the parts between the eggs, so that all the intermediate portions are twisted tight and the eggs firmly inclosed in the envelop as shown in Figs. 6 and 11. The wet paper is a medium tending to preserve the eggs and as it dries its firmness as a mechanical support is increased.

The handle and socket-piece are a convenience but not a necessity for the envelop may be twisted by taking direct hold of the end disk, or other equivalent part attached to that end of the envelop.

It will be seen that the slides of the standard when spread apart to the maximum are spaced to receive the eggs as they are arranged, on the carrier, but as the paper is twisted to form the completed envelop, it of course shortens and for that reason the slides are arranged to move longitudinally on the base so that they may gradually approach one to the other; the minimum space between them is limited by the size of the pedestals, for such space must always be sufficient to receive the longest eggs and in addition half of the two twists at the ends of the eggs.

In the form of standard shown in Fig. 1, the central leg 9 is fixed and the slides on both sides approach thereto during the twisting operation, but this fixed leg might be at the end, the left end as here arranged, and all the slides including the crank post moving toward that end during the twisting operation.

The envelop inclosed eggs are now in shape to be deposited in the container which is effected as follows: In the hollow of the trough 40, made of wood or other suitable material in substantially the form shown, is placed the container 32 with its sides extending up parallel as best shown in Fig. 10. This container may be made of any suitable material but corrugated paste board is desirable as that is light and strong. On the inner surface of this are formed grooves 43 to receive the disks 44 or other desirable form of partition. It will be understood that other means may be used for securing the partitions in place such as strings or metal fasteners but these grooves are simple and convenient. They are spaced to correspond to the envelop inclosed eggs as shown. With the container thus arranged in the trough, there is then set in each groove a partition disk 44 with its slot 46 upwardly arranged to receive each one of the intermediate twisted portions 50 of the envelop. This envelop, with the eggs inclosed as shown and with the end disks attached is then set in place, the end disks going into the end grooves and the intermediate twists 50 into the slots 46 of the intermediate disks 44. When this is done, similar disks 52, with the slots turned down, are pressed home over each twisted portion alongside of each disk 44, whereby the envelop and the eggs are locked securely within the container as best shown in Figs. 10 and 11.

It will be evident that all the disks might first be applied to the envelop and the assembled structure then placed in the container, and the pairs of disks set in the grooves, but this would not be a substantial modification of my process, nor would it be so convenient as the procedure above described.

It now remains only to bend the container sides around the disks and maintain them in that position to form a closed tube with the eggs safely inclosed within. It may be corded or strapped but I prefer to insert the closed tubular container into a tubular jacket 53, which not only maintains the container closed but reinforces and stiffens it so that no ordinary accident will crush it or break the eggs within. Absolutely to avoid any such accident three or more containers may be tied together, when they will be practically as strong as a timber.

It will be understood that the diameter of the disks and the closed container is slightly greater than that of the largest egg so that there will be no possibility of the egg coming in contact with the container wall, and the series of eggs will be carried therein on the partitions, perfectly protected against danger from shock, as well as from blows, for the container and the disks being made of pasteboard or some similar material are both very strong and somewhat resilient, so that the eggs are not only sustained and protected but cushioned thereby.

The twisting of the envelop and the fixing of the partitions, properly spaced within the container, are important features of my invention for thereby the eggs are secured very firmly in the envelop and are maintained in absolutely fixed position in the container, out of all possible contact with its walls or with the partitions or with each other. This method of wrapping and packing the eggs is practical for it is a simple operation and adapts itself automatically to eggs of varying sizes.

A further advantage of my method and means for packing the eggs is its economy. By means of my mechanism here described, the eggs are quickly and conveniently packed, not over a minute or two for the dozen in each container, and this is work for boys. In Fig. 1 I have indicated places for the eggs, but this may of course be a dozen, or more, or less.

The material for the container is very cheap. The containers and the jackets may be shipped flat (with the material for the partitions) to the egg producer or other place where the eggs are packed, the containers as flat sheets, and the jackets also as sheets with the inner portion of one edge ready gummed for closing, or the edges may be sealed to form the jacket into a tube and the jacket tube then flattened.

It will be understood that I do not desire to limit myself to the exact form of mechanism here shown nor to the exact steps of the method here described for those may be much modified without departing from the spirit of my invention.

I have described my invention in connection with eggs, but it will be evident that it may be applied to other articles to be individually wrapped for instance select fruits.

A preservative solution may be used instead of water to wet the envelop strips or it may be applied to the eggs.

Having described my invention I claim,—

1. Apparatus for the packing of eggs in envelops for transportation, comprising means initially for supporting wet strips of paper and the eggs suitably spaced thereon, while the paper is being folded around the eggs, and other means for secondarily supporting the eggs so inclosed while the paper is being twisted about the eggs, said second means being composed of moving elements and said first means composed of sections adapted initially to be arranged alternately with said elements.

2. Apparatus for the packing of eggs in envelops for transportation, comprising means initially for supporting wet strips of paper and the eggs suitably spaced thereon, while the paper is being folded around the eggs, and other means for secondarily supporting the eggs so inclosed while the paper is being twisted about the eggs, said second means being composed of sliding elements and said first means composed of concave sections adapted initially to be arranged alternately with said elements.

3. In an apparatus for packing a series of eggs in an envelop, means to support the eggs and the envelop while the torsion is being applied to the envelop, comprising separate elements arranged to be capable of independent longitudinal movement, means to limit the maximum and minimum distance between the elements, means to engage with one end of the envelop to hold it and means for engaging with the other end of the envelop for twisting the same.

4. In an apparatus for packing a series of eggs in an envelop, a standard to support the eggs and the envelop while torsion is being applied to the latter firmly to inclose the eggs therein and to twist the portions of the envelop intermediate of the eggs, said standard comprising a base, slides fitted to the base and adapted to move independently and longitudinally thereon, said slides having widened bases to limit the minimum distance between the slides, and connections between the adjacent slides to limit the maximum distance between the same, and means to apply said torsion to the envelop.

5. In an apparatus for packing eggs in an envelop, a base, slides forming collectively a supporting standard, and being fitted to slide longitudinally on the base, means to limit the maximum and minimum distance between the slides and a carrier hinged to said base and adapted to be swung into and out of operative position initially to receive and to transfer the envelop and eggs, after the envelop has been folded about the eggs, to said slides for further operation.

6. Apparatus for the packing of eggs in envelops for transportation, comprising a base, a standard composed of slides fitted to slide on said base and capable of limited movement with reference to each other, a carrier composed of concave sections adapted initially to be arranged alternately with the slides of the standard, said carrier being secured to the base and capable of being moved into and out of operative position, and means to support said carrier initially in elevated operative position.

7. Apparatus for the packing of eggs in envelops for transportation comprising a base, a series of slides supported on the base to move longitudinally thereon, means to limit the movement of the slides, a bearing post supported on the base to be movable with the slides, an operating shaft journaled in the post, cranks on the operating shaft whereby it is turned and means to secure the operating shaft to the envelop whereby the latter is twisted.

8. Apparatus for the packing of eggs in envelops for transportation comprising a solid base to set on the operating table, a series of slides secured to said base and fitted to move longitudinally thereon, each slide being composed of a widened pedestal and a forked leg upwardly extending therefrom, connections between the slides to limit their maximum extent of separation, a post supported on the base near one end, a shaft journaled in the post, a crank on the outer end of the shaft, a socket piece on the inner end of the shaft to engage with one end of the envelop, a clamp on the slide at the opposite end of the series to engage with a part on the opposite end of the envelop, a carrier hinged on the base to be swung into and out of operative position, said carrier being composed of concave channeled sections, spaced apart, said sections being adapted to be arranged initially in operative position alternately with the forked legs of the slides, and a supporting leaf hinged to the base and adapted to be turned up to engage with the carrier and maintain it in operative position.

9. Apparatus for the packing of eggs in envelops for transportation comprising a solid base to set on the operating table, a series of slides secured to said base and fitted to move longitudinally thereon, each slide being composed of a widened pedestal and a thin metal forked leg upwardly extending therefrom, each slide being connected to the adjacent slides by plates secured to one and connected to the next by a pin fitted to a slot in the plate to limit the maximum extent of separation between the plates, a post supported on the base near one end and fitted to slide thereon, a shaft journaled in the post, a crank on the outer end of the shaft, a slotted socket piece on the inner end of the shaft to engage with one end of the envelop, the slide at the opposite end being provided with a spring clamp to engage with a part on the opposite end of the envelop, posts on the rear of the base, a carrier composed of channeled sections, spaced apart, said carrier being hinged on said posts by arms, said sections being adapted to be arranged initially in operative position alternately with the forked legs of the slides and a leaf hinged to the back of the base and provided with arms, said leaf being adapted to be turned upwardly to bring its arms beneath the carrier to sustain it temporarily and initially in operative position, substantially as described and shown.

10. Apparatus for the packing of eggs in envelops for transportation, comprising means initially for supporting strips of flexible material and the eggs suitably spaced thereon while the strips are being folded about the eggs, and other means secondarily for receiving the eggs so inclosed within said flexible material and supporting the same while the material is being twisted to form twisted portions between the eggs, said second means being initially arranged immediately below the first means.

11. Apparatus for the packing of eggs in envelops for transportation, comprising means initially for supporting strips of flexible material and the eggs suitably spaced thereon while the strips are being folded about the eggs, and other means secondarily for supporting the eggs so inclosed within said flexible material, while the material is being twisted to form twisted portions between the eggs, both of said means being made up of sections, the sections of one means being arranged alternately with those of the other.

12. Apparatus for the packing of eggs in envelops for transportation, comprising means initially for supporting strips of flexible material and the eggs suitably spaced thereon while the strips are being folded about the eggs, and other means secondarily for supporting the eggs so inclosed within said flexible material while the material is being twisted to form twisted portions between the eggs, both of said means being made up of sections, the sections of the second means being adapted to move independently of each other.

13. Apparatus for the packing of eggs in envelops for transportation, comprising means initially for supporting strips of flexible material and the eggs suitably spaced thereon while the strips are being folded about the eggs, and other means secondarily for supporting the eggs so inclosed within said flexible material, while the material is being twisted to form twisted portions between the eggs, both of said means being made up of sections, the sections of the first being in fixed relation to each other and the sections of the second being arranged to move independently of each other to diminish the spaces between them as said material is being twisted.

14. Apparatus for the packing of eggs in envelops for transportation, comprising means initially for supporting strips of flexible material and the eggs suitably spaced thereon while the strips are being folded about the eggs, and other means secondarily for supporting the eggs so inclosed within said flexible material, while the material is being twisted to form twisted portions between the eggs, said second means being initially arranged immediately below the first, each of said means being composed of sections, the sections of the one being arranged alternately with those of the other, and the first means being adapted to be lowered to transfer the eggs and the envelop to the second means to support the same during the operation of twisting.

15. Apparatus for packing a series of eggs or similar articles arranged longitudinally in an envelop of yielding material, comprising means initially for supporting the strip of yielding material and the eggs suitably spaced thereon while the strip is being folded around the eggs, other means secondarily for supporting the eggs inclosed in the strip while the latter is being twisted and means to twist the strip and form a plurality of twists therein between the adjacent eggs.

16. In an apparatus for packing a series of articles in an envelop, means for supporting an envelop and the articles while torsion is being applied to the former to inclose the articles therein, said means comprising separate elements supported to be capable of movement both relatively to, and simultaneously with, adjacent elements to shorten the series thereby to compensate for progressive contraction of the envelop, means to secure the envelop at one end against rotation whereby twisting from the opposite end will inclose the articles, and means to twist the envelop from the opposite end to inclose the articles.

17. An apparatus for packing a series of articles in an envelop comprising means for the spacing of the articles within the envelop while torsion is being applied to the latter to inclose the articles therein, said means consisting of separate spacing elements arranged to be capable of relative longitudinal movement to compensate for the contraction of the envelop and adapted to establish a minimum spacing for the articles, means to secure the envelop at one end thereof and means to twist the envelop from the opposite end whereby the articles are inclosed.

18. An apparatus for packing a series of articles in an envelop comprising means for the spacing of the articles within the envelop while torsion is being applied to the latter to inclose the articles therein, said means comprising a slide-way support, separate spacing elements arranged on said support to be capable of relative movement to compensate for the contraction of the envelop, said elements being adapted to determine the minimum spacing of the articles and means to secure one end of the envelop against rotation whereby upon twisting the envelop from the opposite end the articles will be inclosed.

19. In an apparatus for packing a series of articles in an envelop, means for supporting an envelop and the article while torsion is being applied to the former to inclose the articles therein, said means comprising a slide-way, separate supporting elements fitted to the slide-way and connected to be capable of movement both relatively to, and simultaneously with, adjacent elements so as to shorten the series and thereby compensate for the contraction of the envelop and means to space the elements to establish a minimum distance between the articles.

20. In an apparatus for packing a series of articles in an envelop, means for supporting the envelop and the articles while torsion is being applied to the former to inclose the articles therein, said means comprising a slide-way, separate supporting elements fitted to the slide-way and arranged to be capable of movement both relatively to, and simultaneously with, adjacent elements so as to shorten the series to compensate for the contraction of the envelop, means carried by one of the supporting elements to secure one end of the envelop against rotation and means to twist the envelop from the opposite end whereby the articles are inclosed.

21. An apparatus for packing a series of articles in an envelop comprising means for the spacing of the articles within the envelop while torsion is being applied to the latter to inclose the articles therein, said means consisting of separate spacing elements, a suitable support therefor, connections between the elements adapted to permit of their relative movement to compensate for the contraction of the envelop, means to establish a minimum spacing of the elements to determine the position of the articles and means to secure the envelop at one end thereof whereby upon twisting of the opposite end the articles will be inclosed.

22. An apparatus for packing a series of articles in an envelop comprising means for the spacing of the articles within the envelop while torsion is being applied to the latter to inclose the articles therein, said means consisting of separate spacing elements, a suitable support therefor, connections between the elements adapted to establish a maximum distance therebetween, said connection being adapted to permit of their relative movement to compensate for the contraction of the envelop, means to establish a minimum spacing of the elements to determine the position of the articles, means to secure the envelop at one end thereof and means for twisting the envelop from the opposite end whereby the articles are inclosed.

23. In an apparatus for packing a plurality of articles longitudinally arranged in a single envelop, means for supporting the envelop and the articles, while torsion is being applied to the former to make the twists at the ends of the envelop and between the articles, comprising a series of separate elements supported each to be capable of movement both relatively to, and simultaneously with, the other elements, to permit the adjacent elements to approach and the entire series to be shortened while the envelop is being shortened by the torsion.

24. In an apparatus for packing a plurality of small articles, arranged longitudinally in a single envelop, means for supporting the envelop and the articles while torsion is being applied to the former to inclose the articles therein, said means comprising a series of similar separate elements, arranged to receive between adjacent elements one each of the articles and to be capable of independent, horizontal, parallel movement, permitting the adjacent elements to approach and the entire series to be shortened to correspond to the shortening of the envelop during torsion.

25. In an apparatus for packing a plurality of articles in a single envelop, means for supporting the envelop and the articles while torsion is being applied to the former to inclose the latter therein, said means comprising a base adapted to remain stationary during the operation and a series of separate supporting elements fitted to slide independently, horizontally and parallel on said base, permitting the adjacent elements to approach and the entire series to be shortened to correspond to the shortening of the envelop during the torsion.

26. An apparatus for packing a plurality of small articles in a single envelop, comprising a series of elements arranged all to be capable of independent longitudinal movement toward and from each other, to support the envelop while torsion is being applied to the same, extensions on said elements to engage and limit the minimum distance between the adjacent elements and positive connections between the adjacent elements to limit the maximum distance therebetween.

27. In an apparatus for packing a plurality of small articles in a single envelop, means for supporting the envelop and the articles while torsion is being applied to the former to inclose the articles therein, said means comprising separate elements supported to be capable of independent movement, said elements having free upper ends on which to receive the envelop.

28. In an apparatus for packing a plurality of small articles in a single envelop, means for supporting the envelop and the articles while torsion is being applied to the former to inclose the latter therein, said means comprising a series of separate elements, supported to be capable of independent movement, said elements being arranged to extend vertically and parallel and having free upper ends and seats formed on said ends in which to receive the envelop.

In testimony whereof I have signed my name to this specification in the presence of two subscribing witnesses.

IRA A. MILLIRON.

Witnesses:
J. ROSCOE MILLWARD,
M. L. BRESLIN.